INVENTOR
Rollie B. Nawman
BY Gerdner & Zimmerman
ATTORNEYS

INVENTOR
Rollie B. Nawman
BY
Garber & Zimmerman
ATTORNEYS

June 28, 1966 R. B. NAWMAN 3,258,535

TELEPHONE PAY STATION

Filed Dec. 8, 1964 4 Sheets-Sheet 3

INVENTOR.

Rollie B. Nawman

BY Gerlach & Zimmerman

Attorneys

June 28, 1966 R. B. NAWMAN 3,258,535

TELEPHONE PAY STATION

Filed Dec. 8, 1964 4 Sheets-Sheet 4

INVENTOR.
Rollie B. Nawman

BY
Gerlach & Zimmerman
Attorneys

United States Patent Office 3,258,535
Patented June 28, 1966

3,258,535
TELEPHONE PAY STATION
Rollie B. Nawman, Piedmont, Calif., assignor to Benner-Nawman, Inc., Oakland, Calif., a corporation of California
Filed Dec. 8, 1964, Ser. No. 416,720
15 Claims. (Cl. 179—6.3)

This invention relates to a telephone pay station and more particularly to an attractive telephone pay station which can make use of a conventional pay telephone.

This application is a continuation-in-part of application Serial No. 272,324, filed April 11, 1963, now abandoned.

Throughout the United States, there is installed a great number of pay telephones which are relatively unattractive in appearance and which do not lend themselves to modern type telephone booths, as, for example, open-walled booths or enclosed telephone booths. There is, therefore, a need for a new and improved telephone pay station which still can make use of such telephones.

In general, it is an object of the present invention to provide a telephone pay station which incorporates the use of a conventional pay telephone and which is still attractive in appearance.

Another object of the invention is to provide a telephone pay station of the above character in which the conventional type telephone is enclosed within an additional enclosure.

Another object of the invention is to provide a telephone pay station of the above character in which only very minor or no modifications need be made to the conventional pay telephone.

Another object of the invention is to provide a telephone pay station of the above character in which ready access can be had to the pay telephone.

Another object of the invention is to provide a telephone pay station of the above character which can be economically manufactured and easily installed.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

In general, my telephone pay station consists of a box-like framework which is provided with a hinged door closing a front opening. A pay telephone of a conventional type is mounted within the box-like framework. The front door is provided with means so that the pay telephone can be operated in a conventional manner.

Figure 3:
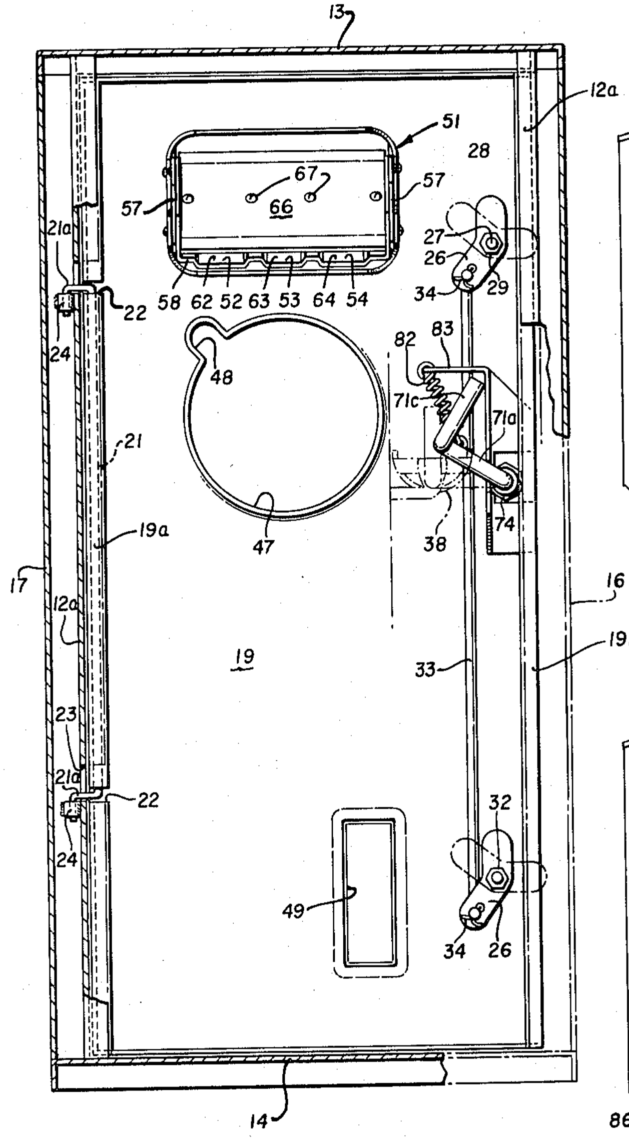
FIGURE 3 is an inside rear elevational view of the door and associated frame.

As shown in the drawings, my pay telephone station consists of a box-like rectangular framework, or enclosure 10 which consists of a rear wall 11, a front wall 12, top and bottom walls 13 and 14, and side walls 16 and 17. A rectangular opening 18 is formed in the front wall 12. A front door 19 is hingedly mounted on the framework 10 for movement between open and closed positions by suitable hinge means. As shown particularly in FIGURE 3 of the drawing, such hinge means can consist of an elongate rod 21 which is secured to one edge of the door by suitable means such as spot welding the same to the door behind the flange 19*a*. Opposite ends of the rod 21 are bent to provide L-shaped portions 21*a* which pass through cut-outs 22 provided in the flange 19*a* of the door 19 and cut-outs 23 provided in the inwardly extending flange portion 12*a* of the front wall 12. The ends of the portions 21*a* are rotatably mounted in sleeves 24 secured to the rear side of the front wall 12 by suitable means such as welding. The cut-outs 22 and 23 are relatively large so that when the door 19 is moved to an open position, the door can be removed from the box-like framework merely by lifting it upwardly so that the portions 21*a* clear the sleeves 24. In addition, it is to be noted that the foregoing arrangements provides a hinge that is invisible from the exterior of the framework 10.

Means is provided for latching the door 19 in a closed position and consists of one or more latch members 26 mounted adjacent the flange 19*b* of the door 19. Preferably a pair of latch members 26 are provided with one of the members rotatably mounted upon a threaded stud 27. A spacer member 28 is mounted on the stud 27 and serves to position the member 26 above the back side of the door so that it can readily clear the raised flange 19*b* of the door. A nut 29 serves to hold the latch member 26 in place. The other latch member 26 is secured to a lock assembly 31 by means of a nut 32 and is mounted on the lock assembly in such a way that it can readily clear the flange 19*b*. Means is provided for interconnecting the latch members 26 so that they operate in unison and consists of a connecting rod 33 which extends through openings provided in the latch members 26 and has its ends secured therein by suitable means such as cotter keys 34. By placing a key in the lock assembly 31, the latch members 26 can be moved between the full line unlatched position shown in FIGURE 3 to the dotted line latched position to move the members 26 behind the flange 12*a* of the front wall 12.

A pay telephone 36 of a conventional type is mounted within the framework 10 and is secured to the rear wall 11 thereof in a conventional manner. The depth of the framework 11 is such that the front portion of the pay telephone is substantially flush with the front opening 18 in the framework or enclosure 10.

As is well known to those skilled in the art, the pay telephone 36 is provided with a dial 37 facing the front opening, which is utilized for dialing the desired telephone number. The telephone also includes a handset hook or cradle 38 movable between the first and second positions. The pay telephone also includes a handset 39 which is connected to the remainder of the telephone by a flexible cord 41. Means is provided in the telephone for yieldably urging the cradle from a first to a second position. The cradle in the first position when it is carrying the handset, disconnects the pay telephone from the telephone circuit and in the second position when it is free of the handset connects the pay telephone to the telephone circuit. The telephone 36 is also provided with means for receiving coins on the upper portion thereof. The pay telephone for use in my telephone booth, however, in this particular embodiment has its coin receiving means modified slightly and is provided with a coin receiving member 42 secured to the telephone by screws 43. Such a pay telephone also includes a coin return chute 44 and a coin release plunger 45.

The cord 41 to the handset 39 extends through a small grommeted opening 46 in the front wall just to the side of the door 19 so that the door can be readily opened and closed. The front door 19 has been dimensioned to provide access to certain of the components of the pay telephone. Thus, as shown, the front door has been provided with a circular opening 47 to expose the dial 37 of the telephone when the door is closed so that the dial can be operated. A smaller opening 48 is provided adjacent the opening 47 to permit access to the coin release plunger 45. A rectangular opening 49 has been provided to permit access to the coin release chute 44.

Means is provided on the front door 19 to permit the coin receiving means 42 provided on the telephone to receive coins. As shown in FIGURES 1–5, this means provided on the front door consists of coin receiving means 51 which is mounted on the front door 19 and is provided with three slots 52, 53 and 54 for receiving suitable denominations of coins such as 25-cent pieces, 10-cent pieces and 5-cent pieces. The coin receiving means 51 consists of a front piece 56 which has been formed in the configuration shown and which extends through an opening in the upper portion of the door 19. A pair of side plates 57 are secured to opposite sides of the member 56 by suitable means such as spot welding, as shown. A U-shaped member 58 has side portions thereof secured to the side members 57 by suitable means such as spot welding as also indicated. The U-shaped member 58 is provided with grooves 62, 63 and 64 which are associated with the slots 52, 53 and 54. A flat plate 66 overlies the grooves 61, 62 and 63 and is secured to U-shaped member 58 by suitable means such as screws 67 which are threaded into the raised portions of the member 58 between the grooves 61, 62 and 63.

Figures 4, 5, 6:
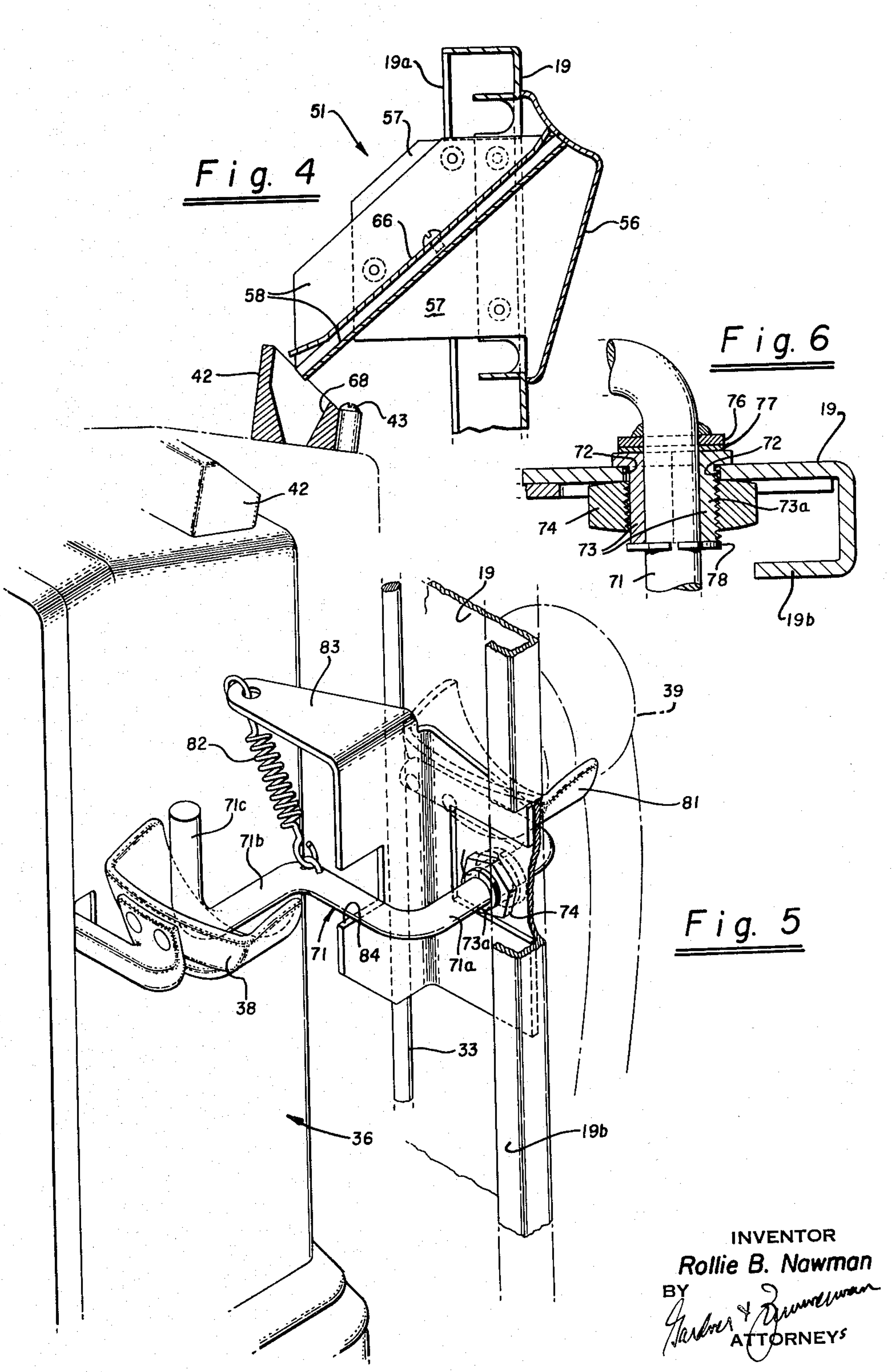
FIGURE 4 is a cross-sectional view of a portion of the coin receiving means provided in the telephone and the cooperating coin receiving means provided in the door.
FIGURE 5 is a partial isometric view of a portion of the pay telephone station showing the operating means provided on the door for operating the handset hook or cradle of the conventional pay telephone.
FIGURE 6 is an enlarged detail view of the mounting for the cradle operating means mounted on the door.

As can be seen particularly from FIGURE 4, the coin receiving means provides means for guiding the slots inwardly and downwardly so that they are received by associated openings 68 provided in the coin receiving member 42 mounted on top of the pay telephone.

Means is provided for operating the cradle or hook 38 provided in the pay telephone 36 when the door 19 is closed and consists of an actuating member or arm 71. Particularly novel means is provided for mounting the arm 71 for pivotal movement within the door 19. In assembling the door, the member 71 is first passed through a hole 72. A flanged split bushing 73 of which one-half **73*a* is threaded and the other half is not threaded is pushed into the hole 72 so that the flanges engage the door. A nut 74 is then threaded onto the split bushing to hold it in place. A washer 76 is affixed to the arm 71 on the outer side of the door by suitable means such as welding. Another washer 77 is disposed between the washer 76 and the flanged bushing 73. A lock washer 78 is secured to the arm 71 on the inner side of the door 19 to hold the arm 71** in place.

Figure 1:
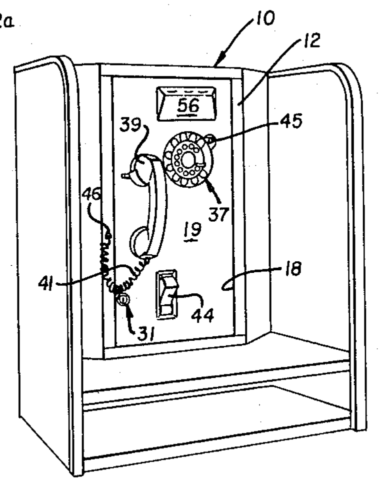
FIGURE 1 is a perspective view of a telephone pay station incorporating the invention with the door closed.
Figure 2:
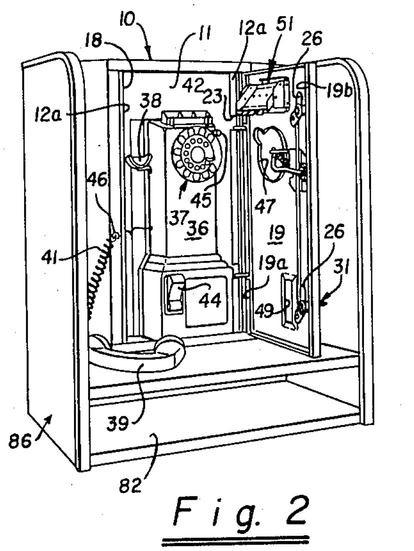
FIGURE 2 is a view similar to FIGURE 1 but showing the door of the telephone pay station in an open position.

As shown particularly in FIGURE 5, the arm 71 extends through the door at right angles to the plane of the door. As can be seen in FIGURE 5, the arm 71 has a substantially U-shaped portion **71*a* with an intermediate portion of the U-shaped portion passing through the sleeve 73. One leg of the U is provided with handset holding means which consists of a cradle 81 which is adapted to receive and carry the handset as shown in FIGURES 1 and 5. Means is provided for yieldably urging the arm 71 from a first position as shown in FIGURE 1 in which it is carrying the handset 39 to a second position as shown in FIGURE 2 in which it is free of the handset and consists of a spring 82 which has one end secured to the other leg of the U-shaped portion of the arm 71 and which has the other end secured to a bracket 83. The bracket 83 is secured to the front door 19 by suitable means such as spot welding. The bracket 83 is provided with a cut-out 84 through which one leg of the U-shaped portion of the member 71 extends. The upper portion of this cut-out 84** serves as an upper limiting stop for the movement of the arm and serves to determine the second position as shown in FIGURE 6.

The arm 71 is also provided with a rearwardly extending horizontal portion **71*b* which is adapted to engage the handset cradle 38 conventionally provided on a pay telephone. The arm 71 is also provided with a vertically extending portion 71*c* which prevents closing of the door 19 unless the handset cradle 38 has been moved upwardly to its second position so that the portion 71*b* is in a position so it can engage the cradle 38**.

Operation and use of my pay telephone station may now be briefly described as follows. Let it be assumed that the pay telephone station is in the position shown in FIGURE 1. Also, let it be assumed that it is desired to call a person. The pay telephone station is operated in the conventional manner. First, the handset 39 is lifted off of the cradle 81. A coin is placed in the proper slot in the coin receiving means 51 and travels downwardly into the coin receiving means 42 provided on the pay telephone and into the pay telephone. As soon as the handset 39 is lifted off of the cradle 73, the spring 82 moves the arm 71 upwardly to release the cradle 38 of the pay telephone. Means is provided within the pay telephone for raising the cradle 38. When the cradle 38 is raised, it causes the necessary electrical connection to be made to the telephone line to which the pay telephone is connected.

As soon as the dial tone is heard, the desired number can be dialed on the diel 37 in the conventional manner. If the line is busy or when the call is completed, the handset 39 can be replaced upon the cradle 73 which will cause the arm 71 to be moved downwardly against the force of the spring 76 to engage the cradle 38 on the pay telephone to also move it downwardly from its second to its first position to disconnect the pay telephone from the telephone line. If a busy signal is received, the coins placed in the coin receiving means will be returned in the coin chute 43 as soon as the cradle 38 is moved downwardly. If a coin becomes jammed or is not properly received by the telephone, the coin release lever 44 can be operated to cause the coin to be released into the chute 43.

From the foregoing, it can be seen that my pay telephone station can be operated in a conventional manner without any difficulty.

When the telephone company desires to have access to the pay telephone behind the front door 19, it is merely necessary to insert a key into the lock 29 to rotate the lock mechanism to move the latching members 26 so they disengage the flanges **12*a*. As soon as this has been done and the handset removed from the cradle 71, the door can be readily opened as shown in FIGURE 2. Then, the coin box on the telephone can be readily opened and the coins removed by the telephone company man. In a similar manner access to the telephone may be had for servicing, or the complete door 19** can be removed as hereinbefore described. As soon as the coins have been collected or servicing has been completed, the door can be readily closed and locked.

Figure 9:
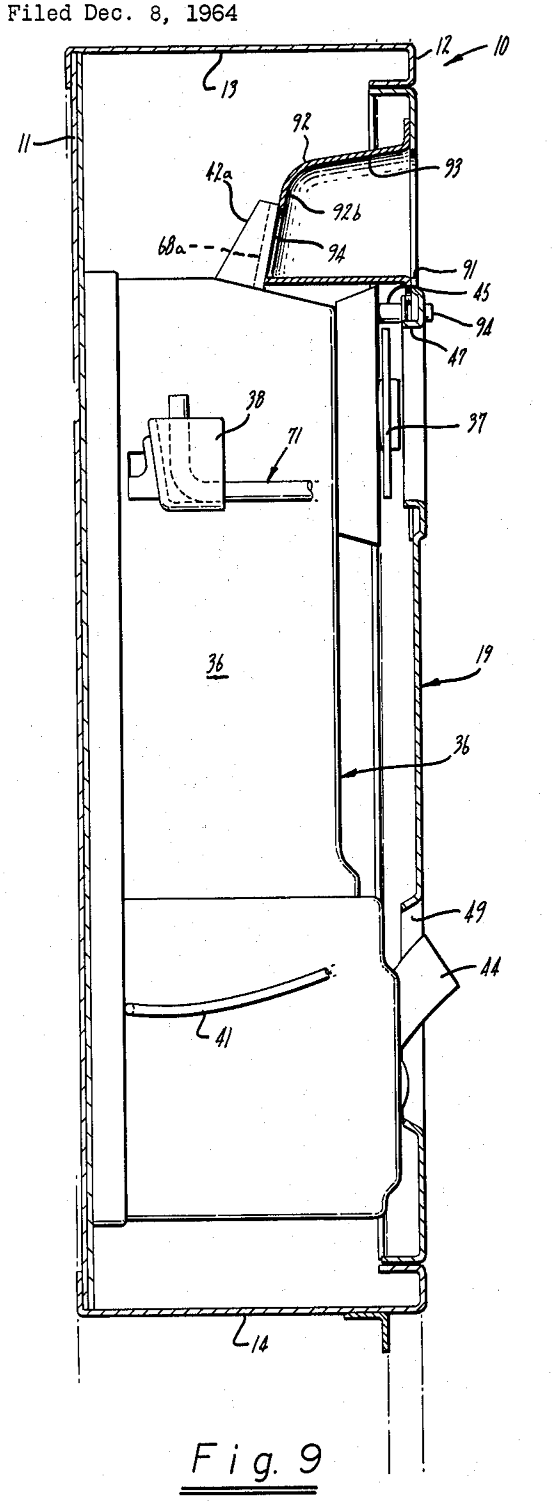
FIGURE 9 is a side elevational view in cross-section with certain parts removed of the telephone pay station shown in FIGURE 7.
Figure 7:
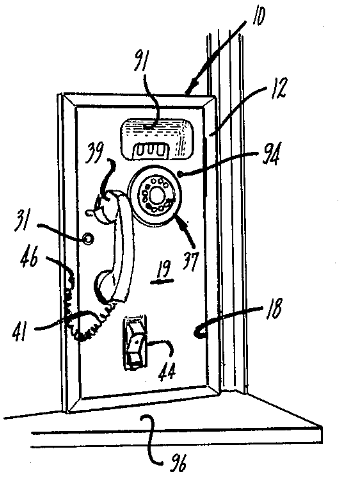
FIGURE 7 is a perspective view of another embodiment of a telephone pay station incorporating the present invention with the door closed.
Figure 8:
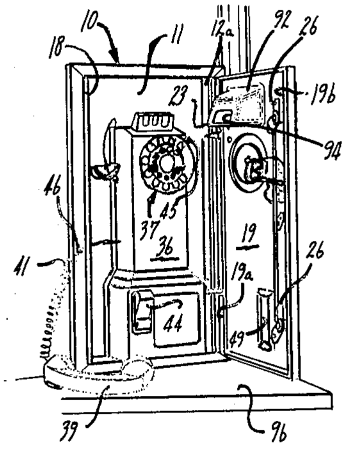
FIGURE 8 is a perspective view similar to FIGURE 7 but showing the door of the telephone pay station in an open position.

Another embodiment of my telephone pay station is shown in FIGURES 7, 8 and 9 which is very similar to the embodiment shown in FIGURES 1–6. In the embodiment shown in FIGURES 7–9, it is unnecessary to modify the telephone 36 and for that reason, in place of the coin receiving member 42, a conventional coin receiving member 42*a* can remain on the upper portion of the telephone. This conventional member 42*a* is provided with a plurality of conventional coin receiving slots 68*a* which lie in a plane which is slightly inclined forwardly from the vertical as shown particularly in FIGURE 9.

As in the embodiment shown in FIGURES 1–6, the embodiment shown in FIGURES 7–9 is provided with means on the front door 19 to permit the coin receiving means 42*a* provided on the telephone to receive coins. In place of the coin receiving means 51 used in the embodiment shown in FIGURES 1–6, a substantially rectangular access opening 91 is provided in the front door 19 in front of the slots 68*a* formed in the coin receiving means 42*a*. A box-like enclosure 92 is mounted on the rear side of the front door 19. It is provided with a flange 92*a* which is secured to the rear surface of the front door 19 by suitable means such as spot welding. The enclosure 92 is provided with a forwardly facing opening 93 which is in registration with the opening 91 provided in the front door 19. The enclosure 92 is also provided with a rear forwardly and upwardly inclined wall which is inclined at the same angle as the front face of the coin receiving means 42*a*. The enclosure 92 is provided with a rectangular opening 94 which is disposed in a rear wall portion 92*b* of the enclosure 92 and is in alignment with the coin receiving slots 68*a* provided in the coin receiving means 42*a*.

It can be seen that the enclosure 92 does not detract from the appearance of the telephone pay station. The enclosure 92 provides an opening in the front door 19 which permits the user's hand ready access to the coin receiving means 42*a* of the pay telephone station while at the same time complementing the overall pleasing appearance given by the telephone pay station. In addition, the construction of the enclosure 92 is such that the door 19 can be readily moved to an open position as shown in FIGURE 8 to permit ready access to the pay telephone. This is true because the enclosure 92 is moved with the front door 19 out of engagement with the coin receiving means 42*a* and when closed is moved into engagement with the coin receiving means 42*a* so that the rear wall portion 92*b* is in engagement with the coin receiving means 42*a*.

The remainder of the pay telephone station shown in FIGURES 7, 8 and 9 is substantially identical to the embodiment hereinbefore described with the exception that a plunger 95 is slidably mounted in the door 19 and is adapted to engage the coin release plunger 45 provided on the pay telephone station.

Figure 10:
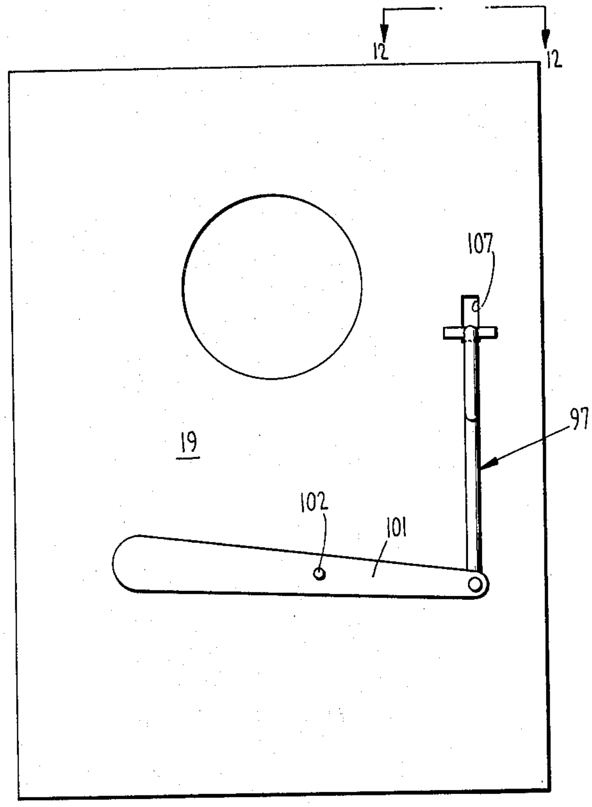
FIGURE 10 is a view similar to FIGURE 3, but illustrating a modified form of operating means provided on the door for operating the handset hook or cradle of the conventional pay telephone.
Figure 11:
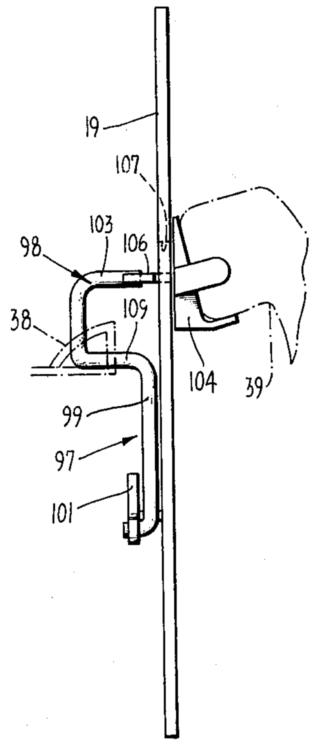
FIGURE 11 is a side elevational view of this form of cradle operating means.
Figure 12:
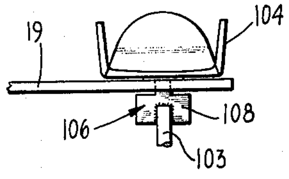
FIGURE 12 is a plan view of the modified form of cradle operating means.

In either of the embodiments of the pay telephone station described hereinbefore, a modified form of cradle operating means of the type shown in FIGURES 10–12, may be employed in place of the arrangement which includes actuating arm 71. This alternative form of cradle operating means is gravity actuated in effecting release of the cradle 38 of the pay telephone 36 from its first to second position. More particularly, there is provided an actuating arm 97 having a substantially U-shaped portion 98 at one end projecting substantially right-angularly from an elongated linear portion 99. The free end of portion 99 is pivotally connected to one end of a lever arm 101 which is pivoted at an intermediate position thereof, as indicated at 102, upon the back of door 19. The free leg 103 of U-shaped portion 98 is end connected to a cradle 104 mounted at the front of door 19 for vertical movement between first and second positions. In this regard, a tongue 106 preferably projects right-angularly from the cradle 104 through a vertical slot 107 provided in the door, such tongue having an enlarged end portion 108 adjacent the back of the door to facilitate retention of the tongue in the slot in slidable relation thereto. The free leg of U-shaped portion 98 is secured to the enlarged portion of the tongue, while the overall arm 97 is disposed in a vertical plane perpendicular to the door with the U-shaped portion projecting away from the back of the door and the linear portion parallel thereto. The slot 107 is positioned relative to the pay telephone 36 such that the leg 109 of U-shaped portion 98 adjacent the linear portion 99 of the actuating arm is engageable with the cradle 38 of the telephone. Moreover, the slot 107 is dimensioned such that in the first position of the actuating arm, as determined by the tongue 106 engaging the lower end of the slot, the leg 109 engages the cradle 38 to retain same in its lower or first position disconnecting the telephone from the line. In the second position of the actuating arm 97, as determined by the tongue engaging the upper end of the slot, the leg 109 is upwardly displaced to release the cradle 38 and thus permit same to move to its upper or second position connecting the telephone to the line.

Movements of the actuating arm from its first to second position and from its second to first position are respectively effected in response to the handset 39 being lifted off of the cradle 104 and being replaced upon this cradle. In this regard it is particularly important to note that the lever arm 101 effects movement of the actuating arm to its second position purely by gravity upon removal of the handset from the cradle 104. More particularly, the weight and length of the free end of the lever arm outwardly from the pivot point 102 are preferably such as to produce a moment which overbalances the moment due to the weight and length of the opposite end of the lever arm and the weight of the actuating arm 71 and cradle 104. Accordingly, when the handset is removed from the cradle 104, the unbalance between the moments acting on the lever arm is such as to pivot the lever arm counterclockwise, as viewed in FIGURE 10, and thereby move the actuator arm 71 upwardly to its second position. This movement is assisted by the means provided in the telephone for normally raising the cradle 38. When the handset 39 is replaced on the cradle 104, the added weight unbalances the system in the opposite direction and urges the actuating arm downwardly to its first position.

Although the system of the actuating arm 71, lever arm 101, and cradle 104 is described above as being unbalanced in itself, it will be appreciated that this system may be alternatively provided in a balanced condition with reliance being placed solely on the means within the telephone acting on the cradle 38 to establish an unbalancing moment in the system. However, where the system is unbalanced in itself to the exclusion of the cradle raising means contained in the telephone, a more positive and rapid releasing action is obtained.

From the foregoing, it can be seen that a conventional pay telephone can be utilized with only very minor or no modifications to the coin receiving means provided on the pay telephone. This is particularly advantageous because it makes it possible to utilize the many millions of pay telephones which are now in existence. It also makes it possible to utilize such pay telephones in modern locations. For example, by utilization of my pay telephone station, the station can be incorporated in an open wall booth 86 such as that shown in FIGURES 1 and 2 which is provided with a recess 82 for receiving a telephone directory. Alternatively, the station can be mounted in a wall and disposed above a shelf 96 as shown in FIGURES 7 and 8. Similarly, if desired, a telephone station of the type herein described can be mounted in an indoor or outdoor telephone booth with very little difficulty.

What is claimed is:

1. In a telephone pay station adapted to be connected to a telephone circuit, a box-like enclosure having rear and front, top and bottom, and side walls with an opening formed in the front wall, a pay telephone mounted in said enclosure, said enclosure having a depth so that the front portion of the pay telephone is substantially flush with said front opening, said pay telephone having a dial facing the front opening for dialing telephone numbers, an operating member movable between first and second positions, means yieldably urging the operating member from said first position to said second position, said operating member in said first position disconnecting the pay telephone from the telephone circuit and in said second position connecting said pay telephone to the telephone circuit, a handset, a flexible cord connecting the handset to the pay telephone, means for receiving coins and a coin return chute, a front door hinged to said enclosure and being adapted to be moved between open and closed positions to open and close said front opening, means for latching said front door in a closed position, said door having an opening therein to permit access to said dial of said pay telephone when said door is in a closed position, an actuating member, means for mounting said actuating member in said door to permit movement of said actuating member between first and second positions, a cradle mounted on the outside of said door on said actuating member and being adapted to carry said handset, a portion of said actuating member being disposed on the rear side of said door being adapted to engage said operating member on the pay telephone, means normally urging said actuating member into a position unobstructing movement of said operating member on said pay telephone to said second position thereof, said handset being of sufficient weight to move the actuating member into engagement with the operating member of the pay telephone to move said operating member from its second to its first position, means mounted on said door permitting the coin receiving means of the pay telephone to receive coins when the door is closed, and means formed on the door to permit access to the coin return chute of the pay telephone.

2. A telephone pay station as in claim 1 wherein the cord extends through said enclosure.

3. A pay telephone station as in claim 1 wherein the door is completely removable from the enclosure.

4. A telephone pay station as in claim 1 wherein the means mounted on the door permitting the coin receiving means on the pay telephone to receive coins consists of coin receiving means mounted in the door and cooperating with the coin receiving means provided on the pay telephone when the door is in a closed position so that the coins placed in the coin receiving means mounted on the door enter the coin receiving means on the telephone directly.

5. A telephone pay station as in claim 1 wherein the means mounted on the door permitting the coin receiving means on the pay telephone to receive coins consists of an opening formed in the front door in front of the coin receiving means on the pay telephone, and an enclosure secured to the frot door and having an opening in registration with the opening in the front door, said coin receiving means having an additional opening in registration with the coin receiving means of the pay telephone when the door is in a closed position so that the user of the telephone pay station can insert coins directly into the coin receiving means of the telephone pay station and the coins can not be lost into the enclosure.

6. A telephone pay station as in claim 1 wherein said means normally urging said actuating member into a position unobstructing movement of said operating member on said pay telephone to said second position thereof including a lever arm pivotally mounted on said door and connected to said actuating member, said lever arm having an unbalanced moment acting thereon in a direction to move said actuating member into said position unobstructing movement of said operating member to said second position thereof when said handset is removed from said cradle.

7. In a telephone pay station adapted to be connected to a telephone circuit, a box-like enclosure having rear and front walls, top and bottom walls, and side walls with an opening in the front wall, a pay telephone mounted in said enclosure, said enclosure having a depth so that the front portion of the pay telephone is substantially flush with the front opening for dialing telephone numbers, said pay telephone also having an operating member movable between first and second positions, and means yieldably urging the operating member from the first position to the second position, the operating member in the first position disconnecting the pay telephone from the telephone circuit and in the second position connecting the pay telephone to the telephone circuit, the pay telephone also comprising a handset and a flexible cord connecting the handset to the pay telephone, said pay telephone also having means for receiving coins and a coin return chute, a front door hinged to said enclosure and movable between open and closed positions to open and close said opening in the enclosure, means for latching the door in a closed position, said door having an opening therein to permit access to the dial of the pay telephone when the door is in a closed position, an actuating member, means pivotally mounting said actuating member in said door to permit movement of the actuating member between first and second positions, means provided on the actuating member for supporting the handset, said actuating member having a portion thereof adapted to engage the operating member of the pay telephone, means connected to the actuating member for yieldably urging the actuating member from its first position to a second position, said actuating member being formed so that when the handset is supported by the actuating member, the actuating member applies force to cause the operating member of the pay telephone to be retained in its first position, and means mounted on the door permitting the coin receiving means of the pay telephone to receive coins, the door also being formed with an opening permitting access to the coin return chute of the pay telephone.

8. A pay telephone station as in claim 7 wherein the cord for the handset extends through a wall of the enclosure.

9. A pay telephone station as in claim 7 together with means for preventing closing of the door unless the operating member and the actuating member have a predetermined cooperative relationship.

10. A pay telephone station as in claim 7 wherein the means for pivotally mounting the actuating member comprises a split bushing.

11. In a telephone pay station adapted to be connected to a telephone circuit, an enclosure having a front wall with an opening formed therein, a telephone mounted in said enclosure, said enclosure having a depth so that the front portion of the pay telephone is substantially flush with said front opening, said pay telephone having a dial facing the front opening for dialing telephone numbers, an operating member movable between the first and second positions, means yieldably urging the operating member from said first position to said second position, said operating member in said first position disconnecting the pay telephone from the telephone circuit and in said second position connecting said pay telephone to the telephone circuit, a handset, a flexible cord connecting the handset to the pay telephone, a front door mounted on said enclosure and being adapted to be moved between open and closed positions to open and close said front opening, means for latching said front door in a closed position, said door being formed to permit said dial of said pay telephone to be operated, an actuating member, means for mounting said actuating member in said door to permit pivotal movement of said actuating member between first and second positions, a cradle mounted on said actuating member on the outside of said door and being adapted to carry said handset, a portion of said actuating member being disposed on the rear side of said door and being adapted to engage said operating member on the pay telephone, and means normally urging said actuating member into a position out of engagement with said operating member on said pay telephone, said handset being of sufficient weight to move the actuating member into engagement with the operating member of the pay telephone to move said operating member from its second to its first position.

12. A telephone pay station as in claim 11 wherein the pay telephone is provided with coin receiving means and wherein the front door is formed to permit the coin receiving means of the pay telephone to receive coins.

13. A telephone pay station as in claim 12 wherein the means mounted on the door permitting the coin receiving means of the telephone to receive coins consists of an opening formed in the front door, an enclosure secured to the front door and having an opening therein in registration with the opening in the front door, said enclosure having an additional opening in registration with the coin receiving slots of the coin receiving means of the pay telephone so that the user of the pay telephone can insert coins into the coin receiving means of the pay telephone.

14. A pay telephone station as in claim 12 together with coin receiving means mounted on the front door and cooperating with the coin receiving means provided on the pay telephone when the front door is in a closed position so that coins placed in the coin receiving means mounted on the door pass directly into the coin receiving means of the pay telephone.

15. In a telephone pay station adapted to be connected to a telephone circuit, a box-like enclosure having rear and front, top and bottom, and side walls with an opening formed in the front wall, a pay telephone mounted in said enclosure, said enclosure having a depth so that the front portion of the pay telephone is substantially flush with said front opening, said pay telephone having a dial facing the front opening for dialing telephone numbers, an operating member movable between first and second positions, means yieldably urging the operating member from said first position to said second position, said operating member in said first position disconnecting the pay telephone from the telephone circuit and in said second position connecting said pay telephone to the telephone circuit, a handset, a flexible cord connecting the handset to the pay telephone, means for receiving coins and a coin return chute, a front door hinged to said enclosure and being adapted to be moved between open and closed positions to open and close said front opening, means for latching said front door in a closed position, said door having an opening therein to permit access to said dial of said pay telephone when said door is in a closed position, a movable actuating member mounted in said door and having a portion disposed on the rear side of said door engageable with said operating member of said pay telephone, said actuating member movable between first and second positions wherein said portion of said actuating member respectively engages said operating member in said first and second positions thereof, a cradle for carrying said handset mounted on the outside of said door and secured to said actuating member, a lever arm pivotally mounted on the inside of said door and having one end connected to said actuating member, said lever arm having a first moment acting thereon in opposition to a second moment acting thereon due to the combined weight of said actuating member and said cradle, said first moment acting in a direction tending to move said actuating member to said second position thereof, said second moment acting in a direction tending to move said actuating member to said first position thereof, said first moment equal to at least said second moment, means mounted on said door permitting the coin receiving means of the pay telephone to receive coins when the door is closed, and means formed on the door to permit access to the coin return chute of the pay telephone.

No references cited.

KATHLEEN H. CLAFFY, *Primary Examiner.*

ROBERT H. ROSE, *Examiner.*

H. ZELLER, *Assistant Examiner.*